US 7,614,037 B2

(12) United States Patent
Gavrilov

(10) Patent No.: US 7,614,037 B2
(45) Date of Patent: Nov. 3, 2009

(54) METHOD AND SYSTEM FOR GRAPH ANALYSIS AND SYNCHRONIZATION

(75) Inventor: Dmitri Gavrilov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 10/918,776

(22) Filed: Aug. 13, 2004

(65) Prior Publication Data

US 2005/0262470 A1 Nov. 24, 2005

Related U.S. Application Data

(60) Provisional application No. 60/573,288, filed on May 21, 2004.

(51) Int. Cl.
*G06F 9/44* (2006.01)
*G06F 9/45* (2006.01)
*G06T 11/20* (2006.01)
*G06G 7/62* (2006.01)

(52) U.S. Cl. .................. 717/105; 717/136; 345/440; 703/13

(58) Field of Classification Search ................ 717/100, 717/136, 144–151, 155–160, 105

See application file for complete search history.

(56) References Cited

U.S. PATENT DOCUMENTS 4,698,751 A * 10/1987 Parvin .......................... 712/19
4,953,106 A * 8/1990 Gansner et al. ............. 345/440
5,187,785 A * 2/1993 Shah ............................. 714/25

(Continued)

OTHER PUBLICATIONS

Megiddo, Nimrod and Sarkar, Vivek, "Optimal Weighted Loop Fusion for Parallel Programs", ACM 19976, p. 282-291, retrieved Dec. 2, 2002 from the ACM database.*

(Continued)

*Primary Examiner*—James Rutten
(74) *Attorney, Agent, or Firm*—Workman Nydegger

(57) ABSTRACT

A cyclic graph may be partitioned. The partitions of the cyclic graph may include an acyclic component of the cyclic graph and a set of partitioned links. The partitions of the cyclic graph may have a particular order. The elements of the cyclic graph may be serialized with a particular serialization order. The serialization order of the elements of the cyclic graph may correspond to the order of the partitions of the cyclic graph. The elements of the acyclic component of the cyclic graph may be serialized before the elements of the set of partitioned links. A computer system may include a graph synchronization component configured to partition the cyclic graph and determine the serialization order of the elements of the cyclic graph. A serialization of the cyclic graph does serialize the elements of the cyclic graph in the determined serialization order.

33 Claims, 13 Drawing Sheets

U.S. PATENT DOCUMENTS

| | | | | |
|---|---|---|---|---|
| 5,515,487 | A | * | 5/1996 | Beaudet et al. ............. 345/440 |
| 5,748,188 | A | * | 5/1998 | Hu et al. .................... 715/853 |
| 5,784,557 | A | * | 7/1998 | Oprescu .................... 709/220 |
| 6,499,037 | B1 | * | 12/2002 | Breitbart et al. ......... 707/103 R |
| 6,553,384 | B1 | | 4/2003 | Frey et al. |
| 6,651,246 | B1 | * | 11/2003 | Archambault et al. ....... 717/160 |
| 6,708,187 | B1 | * | 3/2004 | Shanumgam et al. ....... 707/201 |
| 6,768,988 | B2 | * | 7/2004 | Boreham et al. ................ 707/3 |
| 6,832,370 | B1 | * | 12/2004 | Srinivasan et al. .......... 717/161 |
| 7,185,328 | B2 | * | 2/2007 | Grover ....................... 717/156 |
| 7,389,335 | B2 | * | 6/2008 | MacLeod et al. ............ 709/223 |
| 2002/0166112 | A1 | * | 11/2002 | Martin et al. ............... 717/124 |
| 2003/0055991 | A1 | * | 3/2003 | Krishnapuram et al. ..... 709/229 |
| 2005/0257200 | A1 | * | 11/2005 | Taylor ........................ 717/136 |
| 2008/0114937 | A1 | * | 5/2008 | Reid et al. .................. 711/117 |

OTHER PUBLICATIONS

Karp et al., "The Grasper-CL Graph Management System" 1994, Kluwer Academic Publishers, LISP and Symbolic Computation, 30 pages.*

Good, G., "The LDAP Data Interchange Format (LDIF)—Technical Specification," *Network Working Group, Request for Comments: 2849*, pp. 1-14, Standards Track, The Internet Society (Jun. 2000).

Mansfield et al., "Schema Publishing in X.500 Directory," *Network Working Group, Request for Comments: 1804*, pp. 1-10, Experimental (Jun. 1995).

Wahl et al., "Lightweight Directory Access Protocol (v3)," *Network Working Group, Request for Comments: 2251*, pp. 1-50, Standards Track, The Internet Society (Dec. 1997).

Wahl et al., "Lightweight Directory Access Protocol (v3) : Attribute Syntax Definitions," *Network Working Group, Request for Comments: 2252*, pp. 1-32, Standards Track, The Internet Society (Dec. 1997).

Wahl, "A Summary of the X.500(96) User Schema for use with LDAPv3," *Network Working Group, Request for Comments: 2256*, pp. 1-20, Standards Track, The Internet Society (Dec. 1997).

Johner, Heinz, et al. "Understanding LDAP" IBM Redbooks, Nov. 10, 1999, p. 1-193 (complete document).

Chartrand, Gary, *Introductory Graph Theory*, Dover Publications, Inc., New York, pp. 1-25, 147-152 (1977).

Freire, et al., "Integrating Network Devices in a Meta-Directory: the MetaComm Experience," *Information Systems*, vol. 27, pp. 193-217 (2002).

Xie, Aiguo and Peter A. Beerel, "Implicit Enumeration of Strongly Connected Components and an Application to Formal Verification," *IEEE Transactions on Computer-Aided Design of Integrated Circuits and Systems*, vol. 19, No. 10, pp. 1225-1230 (2002).

Zhao-Hong et al., "Minimizing the Copy Graph to Improve Scalability," *Proceedings of the Fourth International Conference on Parallel and Distributed Computing, Applications and Technologies*, Chengdu, China, pp. 923-926 (2003).

\* cited by examiner

Graph Synchronization Application Programming Interface

Set Partitioning Parameters
1302

Get Partitioning Parameters
1304

Partition Graph
1306

Serialize Graph
1308

Synchronize Graphs
1310

METHOD AND SYSTEM FOR GRAPH ANALYSIS AND SYNCHRONIZATION

CROSS-REFERENCE TO RELATED PATENT APPLICATIONS

This patent application. Claims the benefit of U.S. Provisional Patent Application No. 60/573,288, filed May 21, 2004, entitled "METHOD AND SYSTEM FOR GRAPH ANALYSIS AND SYNCHRONIZATION."

FIELD OF THE INVENTION

This invention pertains generally to computer systems and, more particularly, to the manipulation of computer system data structures.

BACKGROUND OF THE INVENTION

Many useful computer system applications incorporate graph data structures having nodes (i.e., vertices) and links between nodes (i.e., edges), for example, computer system applications that interact with networks, organizational structures and database schemas. As a result, graph management systems (GMS) of various types have become popular. A common GMS operation is the replication of a graph within or between graph management systems or, more generally, the synchronization of two graphs.

For the purposes of this description, graph management systems may be categorized into verified graph management systems (VGMS) and unverified graph management systems. Verified graph management systems may verify that a managed graph is in a valid state following each graph manipulation operation. For example, verified graph management systems may disallow graph manipulation operations that would result in links to nonexistent nodes or that would violate some other configured graph constraint. Examples of verified graph management systems include some lightweight directory access protocol (LDAP) servers and structured query language (SQL) servers.

A particular graph constraint that may result in difficulties when synchronizing graphs is an infrastructure link (or infrastructure edge) constraint. Infrastructure links are links that are (and in some cases, must be) created as part of the creation of an associated node. Examples of infrastructure links include LDAP schema class inheritance relationships and some other relationships utilized to define objects and classes of objects.

Problems may arise when replicating a cyclic graph (i.e., a graph having cycles or loops) to a verified graph management system. For example, it may not be possible, without modifying the cyclic graph, to create the nodes and associated infrastructure links of the cyclic graph at the verified graph management system in an order that avoids attempts to link to not-yet-existent nodes. If the verified graph management system disallows the creation of links to nonexistent nodes then it may not be possible to replicate the cyclic graph to the verified graph management system.

FIG. 1 illustrates a problem replicating a simple cyclic graph 100 to the example verified graph management system. Node 102 and infrastructure link 104 require that node 106 exist before they may be created. Node 106 and infrastructure link 108 require that node 110 exist before they may be created. However, node 110 and infrastructure link 112 require that node 102 exist before they may be created. As a result, there is no creation order for the nodes 102, 106 and 110, and their associated infrastructure links 104, 108 and 112, that avoids an attempt to create a link to a not-yet-existent node. It may not be possible to replicate the graph 100 to the verified graph management system.

In practice, graphs may be significantly more complex than graph 100. A further complication arises because of the variety of link types. There may be multiple categories of links in addition to infrastructure links including links that may change category if necessary, for example, to achieve replication and/or synchronization.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, a cyclic graph is partitioned. The partitions of the cyclic graph may include an acyclic component of the cyclic graph and a set of partitioned links. The partitions of the cyclic graph may have a particular order. The elements of the cyclic graph may be serialized with a particular serialization order. The serialization order of the elements of the cyclic graph may correspond to the order of the partitions of the cyclic graph, for example, the elements of the acyclic component of the cyclic graph may be serialized before the elements of the set of partitioned links. In an embodiment of the invention, a computer system includes a graph synchronization component configured to partition the cyclic graph and determine the serialization order of the elements of the cyclic graph. In an embodiment of the invention, a serialization of the cyclic graph does serialize the elements of the cyclic graph in the determined serialization order.

BRIEF DESCRIPTION OF THE DRAWINGS

While the appended claims set forth the features of the invention with particularity, the invention and its advantages are best understood from the following detailed description taken in conjunction with the accompanying drawings, of which:

FIG. 13 is a block diagram depicting an example graph synchronization application programming interface in accordance with an embodiment of the invention.

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
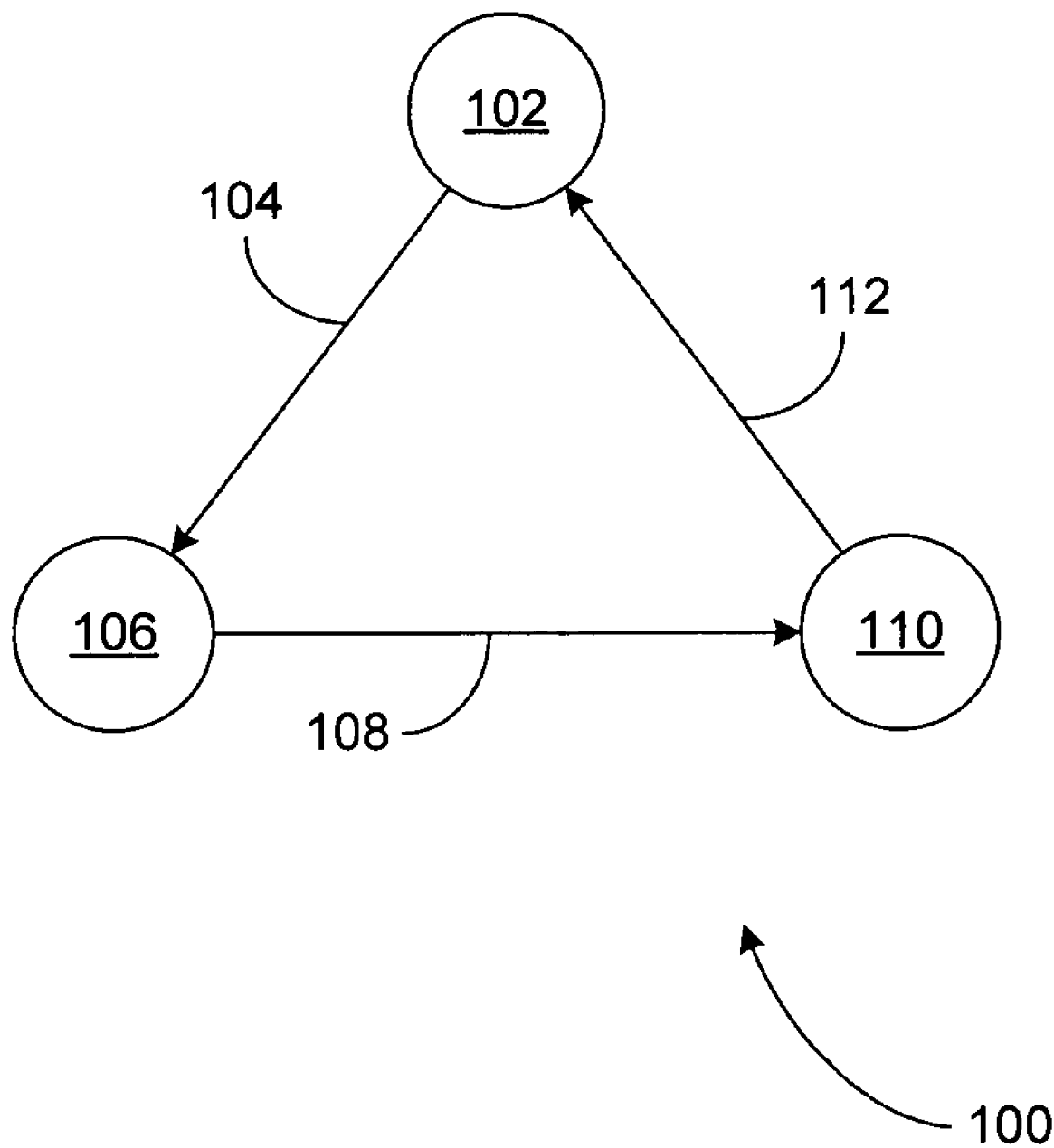
FIG. 1 is a schematic diagram of a simple cyclic graph.
Figure 2:
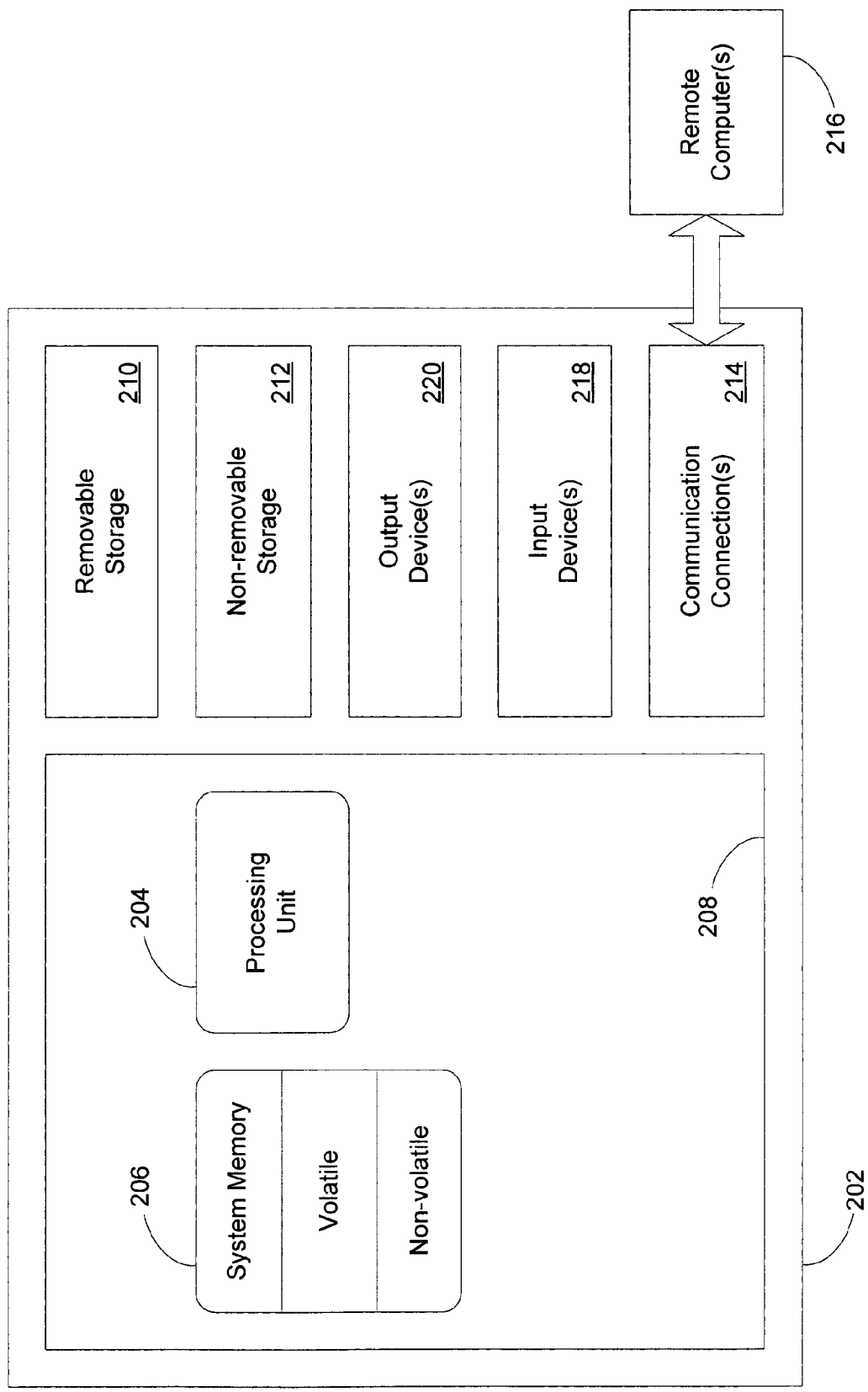
FIG. 2 is a schematic diagram generally illustrating an exemplary computer system usable to implement an embodiment of the invention.

Referring to FIG. 2, an example of a basic configuration for the computer 202 on which aspects of the invention described herein may be implemented is shown. In its most basic configuration, the computer 202 typically includes at least one processing unit 204 and memory 206. The processing unit 204 executes instructions to carry out tasks in accordance with various embodiments of the invention. In carrying out such tasks, the processing unit 204 may transmit electronic signals to other parts of the computer 202 and to devices outside of the computer 202 to cause some result. Depending on the exact configuration and type of the computer 202, the memory 206 may be volatile (such as RAM), non-volatile (such as ROM or flash memory) or some combination of the two. This most basic configuration is illustrated in FIG. 2 by dashed line 208.

The computer 202 may also have additional features/functionality. For example, computer 202 may also include additional storage (removable 210 and/or non-removable 212) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 202. Any such computer storage media may be part of computer 202.

The computer 202 preferably also contains communications connections 214 that allow the device to communicate with other devices such as remote computer(s) 216. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 202 may also have input devices 218 such as a keyboard/keypad, mouse, pen, voice input device, touch input device, etc. Output devices 220 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In an embodiment of the invention, a computer system such as the computer 202 includes a graph synchronization component to facilitate the synchronization of graphs within and/or between graph management systems. In particular, the graph synchronization component may facilitate the synchronization of cyclic graphs at verified graph management systems. The graph synchronization component may facilitate the synchronization of cyclic graphs at verified graph managements systems by partitioning each cyclic graph into multiple partitions including an acyclic graph and a set of non-infrastructure links called partitioned links or partitioned edges. The partitioned links may be understood as the set of links that are "cut" from the cyclic graph to transform the cyclic graph into the acyclic graph, that is, to reduce the cyclic graph to its acyclic component.

The cyclic graph partitioning performed by the graph synchronization component may be such that the resultant acyclic graph has a high probability of satisfying a set of configured graph constraints of a particular verified graph management systems relative to the cyclic graph, for example, a graph element (i.e., node and link) creation order may be determined for the acyclic graph such each node referenced by a link does exist at link creation time. Once the acyclic graph is established at the verified graph management system, the partitioned links may be added with relatively low probability of constraint violation, thus achieving synchronization of the cyclic graph at the verified graph management system with relatively high probability.

Figure 3:
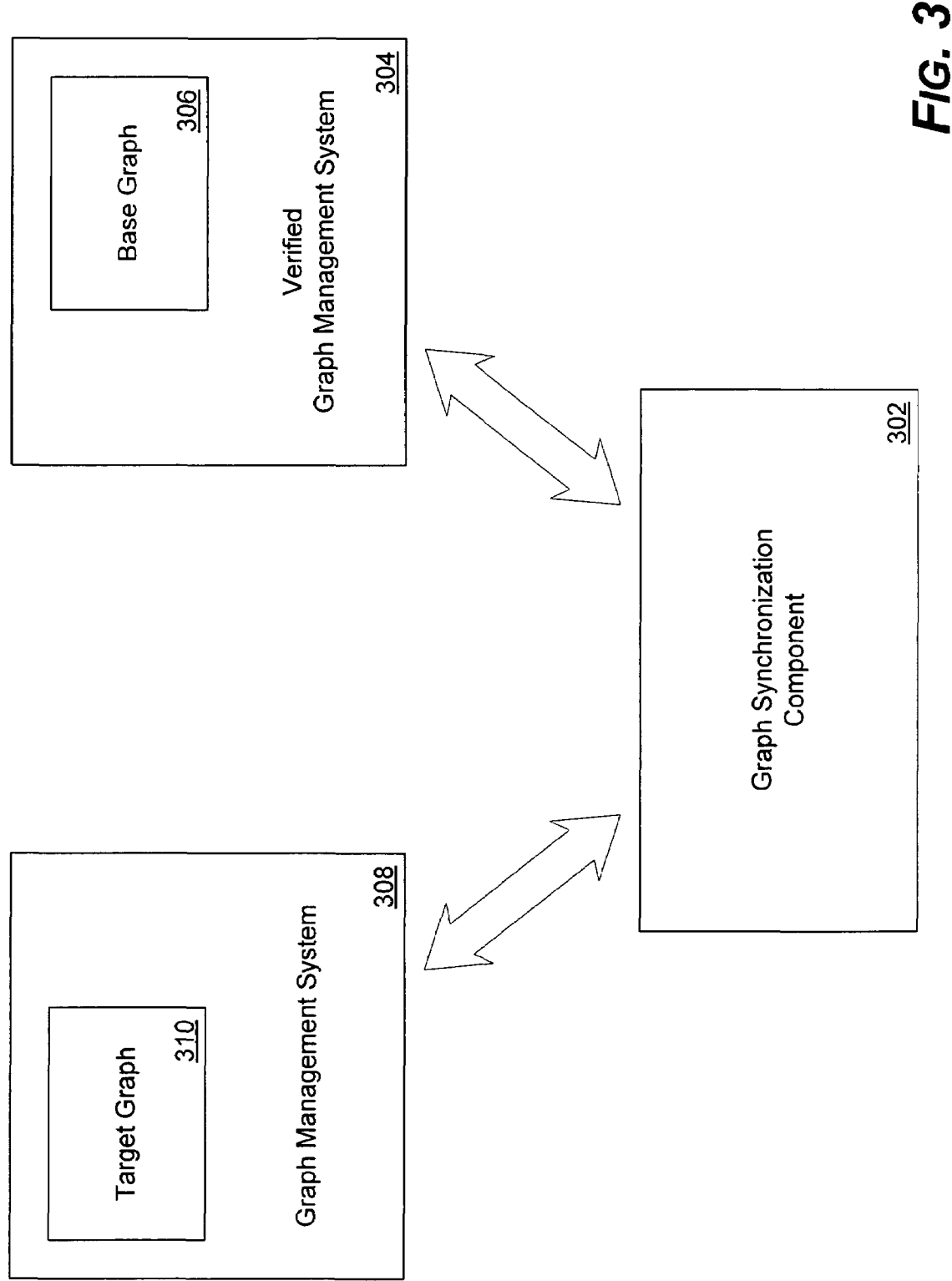
FIG. 3 is a schematic diagram illustrating an example high level computer systems architecture in accordance with an embodiment of the invention.

FIG. 3 depicts an example high level computer systems architecture in accordance with an embodiment of the invention. In FIG. 3, a graph synchronization component 302 interacts with a verified graph management system 304 managing a base graph 306 and a graph management system 308 managing a target graph 310. The graph synchronization component 302, the graph management system 308 and the verified graph management system may reside on separate computers or on a single computer (such as the computer 202 of FIG. 2). The graph management system 308 may be a verified graph management system, although it need not be. In an embodiment of the invention, the graph synchronization component 302 may be incorporated into the graph management system 308 and/or the verified graph management system 304. In an embodiment of the invention, the base graph 306 and the target graph 310 may be managed by a same verified graph management system or by different versions of a same verified graph management system. Although, for clarity, FIG. 3 shows the single target graph 310, as will be appreciated by one of skill in the art an embodiment of the invention may include and process a plurality of target graphs.

The graph synchronization component 302 may create, read, update and delete the base graph 306 and the target graph 310 in accordance with constraints imposed by the verified graph management system 304 and the graph management system 308 respectively. In an embodiment of the invention, a task of the graph synchronization component 302 is to synchronize the base graph 306 with the target graph 310. The base graph 306 may be a null graph (i.e., have no nodes or links). The base graph 306 may include copies or versions of one or more of the nodes and/or links of the target graph 310. Following synchronization, a goal is for the base graph 306 to have copies of, at least, each of the nodes and links of the target graph 310. Example details of the graph synchronization component 302 are described below with reference to FIG. 4.

Figure 4:
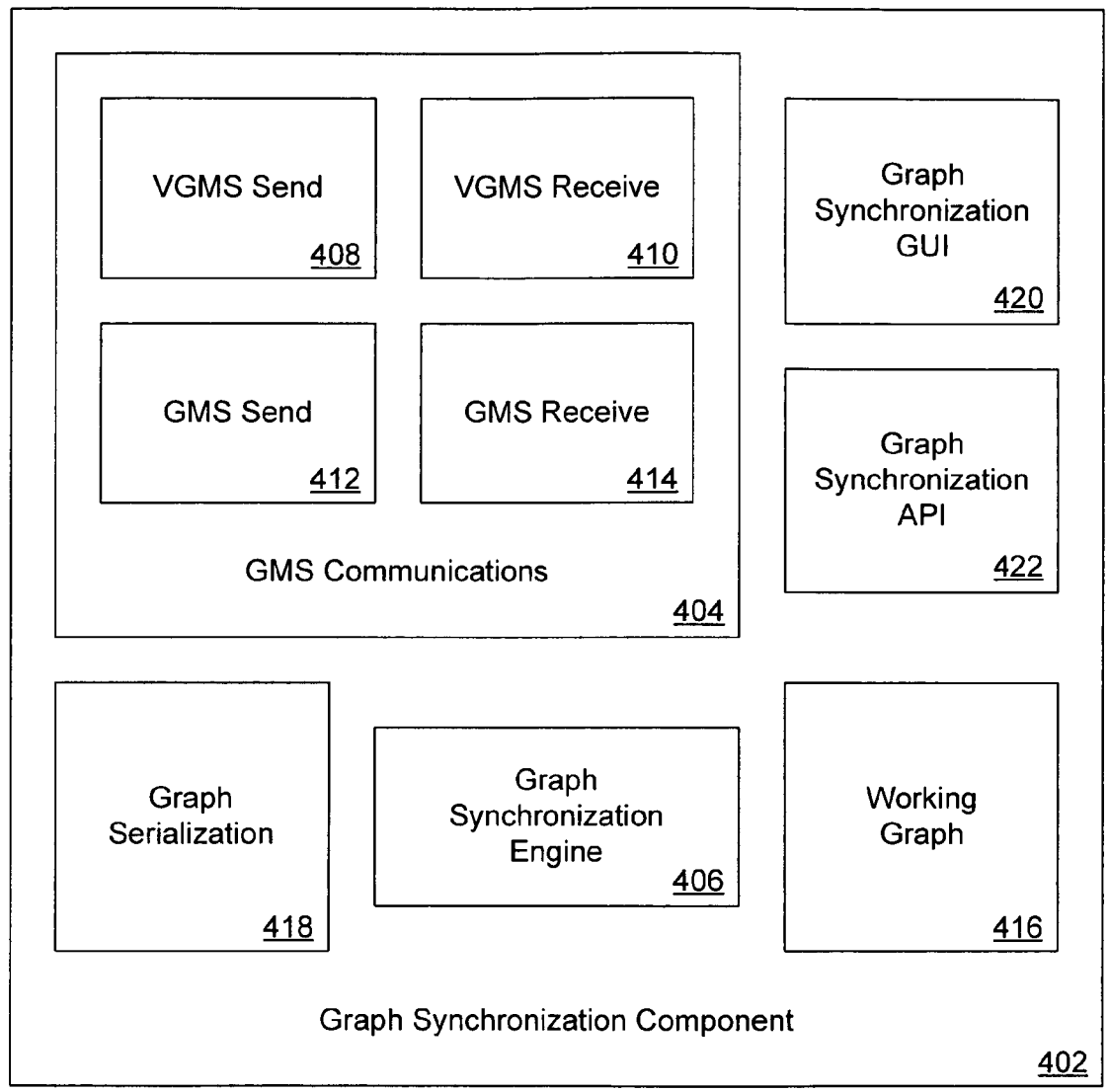
FIG. 4 is a schematic diagram illustrating an example graph synchronization component in accordance with an embodiment of the invention.

FIG. 4 depicts an example graph synchronization component 402 in accordance with an embodiment of the invention. The graph synchronization component 402 includes a graph management system (GMS) communications 404 module utilized by a graph synchronization engine 406 to communicate with graph management systems containing base and target graphs such as the verified graph management system 304 (FIG. 3) and the graph management system 308. The graph management system communications 404 module is explicitly depicted as including a verified graph management system (VGMS) send 408 module and a verified graph management system receive 410 module for sending and receiving messages to and from verified graph management systems, as well as a graph management system (GMS) send 412 module and a graph management system receive 414 module for sending and receiving messages to and from graph management systems. The graph management system communications 404 module may include further modules for communicating with any suitable type of graph management system including other graph synchronization components.

The graph synchronization engine 406 may utilize the graph management system communications 404 module to request and receive copies of base and target graphs. From the base and target graphs, the graph synchronization engine 406 may create a working graph 416. Each node and link in the working graph 416 may be associated with one or more graph synchronization tags (e.g., data fields), for example, a "present in base graph" tag, a "graph synchronization category" tag, a "graph synchronization weight" tag, a "partitioned link" tag, and/or a "serialization order" tag. Each graph synchronization tag may be associated with one or more attribute types and values. As a result of managing graphs, the graph synchronization component 402 is itself a type of graph management system. The graph synchronization component 402 may be a verified graph management system, but in that case, the graph constraints enforced by the graph synchronization component 402 would typically be lax to avoid the kind of graph replication problems that the graph synchronization component 402 helps to solve.

The graph synchronization engine 406 may assign graph synchronization tags and graph synchronization tag attribute values to the nodes and links of the working graph 416. The graph synchronization engine 406 may partition the working graph 416 as a function of the presence and/or attribute values of the graph synchronization tags. The graph synchronization engine 406 may then create a graph serialization 418 for the verified graph management system 304 (FIG. 3) managing the base graph 306 from the partitioned working graph 416. The graph serialization 418 may specify a graph element creation order for synchronizing the base graph 306 at the verified graph management system 304 with the target graph 310.

The graph serialization 418 may be stored in a format understood (i.e., able to be parsed) by the verified graph management system 304 (FIG. 3). Alternatively, the graph management system communications 404 module may be capable of formatting the graph serialization 418 into any suitable graph serialization format. Examples of suitable graph serialization formats include LDAP data interchange format (LDIF) for lightweight directory access protocol servers and structured query language (SQL) scripts for structured query language servers, both of which are known in the art and need not be further detailed here.

The graph synchronization component 402 may further include a graph synchronization graphical user interface (GUI) 420. The graph synchronization graphical user interface may display graph synchronization component 402 attributes, for example, the nodes and links of the working graph 416 as well as their associated graph synchronization tags, the state and progress of the graph synchronization engine 406, the parameters utilized by the graph synchronization engine 406 to partition the working graph 416 and create the graph serialization 418, the graph serialization 418, as well as graph management system communications status and parameters. Graph synchronization component 402 attributes may be displayed with any suitable graphical representation, for example, working graph links may be displayed with a color and/or highlighting corresponding to their partitioned status (i.e., partitioned or not partitioned) and/or to a graph synchronization weight associated with the link.

A computer system user may utilize the graph synchronization graphical user interface 420 to control the operation of the graph synchronization component 402. In particular, the computer system user may adjust parameters and expressions utilized by the graph synchronization engine 406 to automatically partition the working graph 416 and/or manually adjust the partitioning of the working graph 416. High level partitioning settings such as "cut lightly," and "cut severely," each associated with a set of low level partitioning parameters, may be presented for user selection as well as low level partitioning parameters.

The graph synchronization component 402 may execute in a fully automatic mode, a partially automated mode and/or a manual mode. In the manual mode, the graph synchronization component 402 may make a maximum amount of information available to the computer system user and take action primarily in response to user input through the graph synchronization graphical user interface 420. In the partially automated mode, the graph synchronization component 402 may primarily display summary-level information and seek user approval for major actions such as updating the base graph at the verified graph management system. In the fully automatic mode, the graph synchronization component 402 may display minimal information such as progress and/or status or the graph synchronization graphical user interface may be inactive in the fully automatic mode.

The graph synchronization component 402 may further include a graph synchronization application programming interface (API) 422. The graph synchronization application programming interface 422 may enable computer system components to configure and control the graph synchronization component 402. An example graph synchronization application programming interface in accordance with an embodiment of the invention is described in more detail below with reference to FIG. 13.

Figure 5:
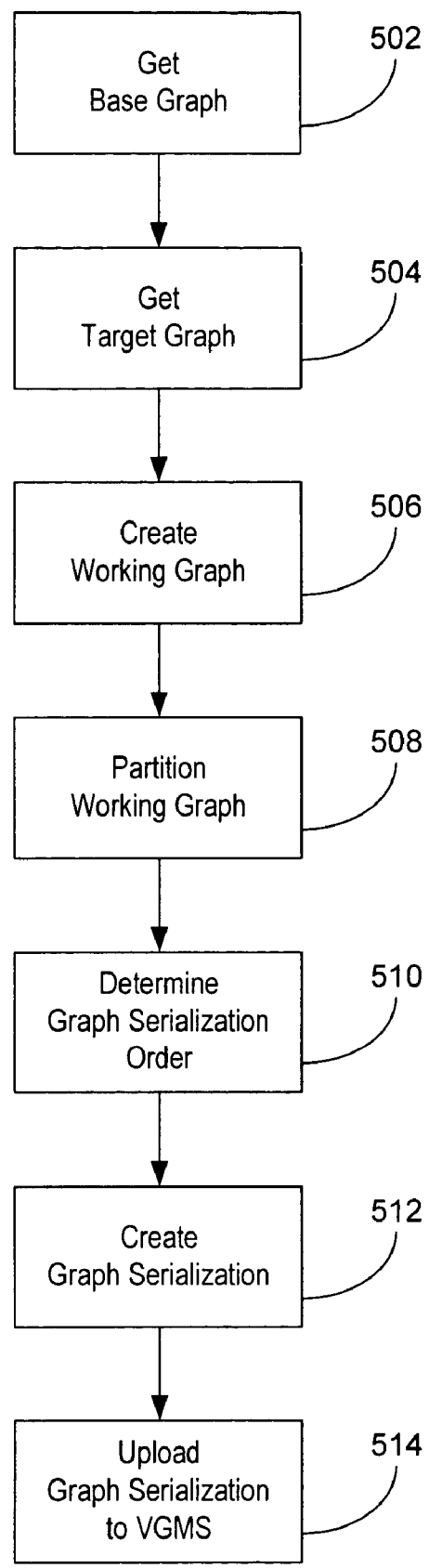
FIG. 5 is a flowchart depicting example steps for synchronizing two graphs in accordance with an embodiment of the invention.

FIG. 5 depicts example steps for synchronizing two graphs in accordance with an embodiment of the invention. For example, the steps of FIG. 5 may be performed by the graph synchronization component 402 of FIG. 4. At step 502, a copy of the base graph may be retrieved. For example, the graph synchronization engine 406 may request and receive the base graph 306 of FIG. 3. At step 504, a copy of the target graph may be retrieved. For example the graph synchronization engine 406 may request and receive the target graph 310.

At step 506, the working graph 416 (FIG. 4) may be created. For example, the graph synchronization engine 406 may instantiate the working graph 416 with each of the nodes and links of the target graph 310 (FIG. 3). Tagging of the nodes and links of the working graph 416 may also occur at this time. For example, graph elements present in the target graph 310 that are also present in the base graph 306 may be tagged in the working graph 416 as "present in base graph."

At step 508, the working graph 416 (FIG. 4) may be partitioned into multiple partitions including an acyclic component and a set of partitioned links. Graph elements tagged as "present in base graph" may also be treated as partitioned or removed from the working graph 416. Example steps for partitioning the working graph 416 in accordance with an embodiment of the invention are described below in more detail with reference to FIG. 8.

At step 510, a graph serialization order may be determined for the graph elements of the partitioned working graph 416. The working graph 416 partitions may have an order and the graph serialization order may correspond to the order of the working graph 416 partitions, for example, the graph elements of the acyclic component may come before the partitioned links in the graph serialization order. The graph elements within the working graph 416 partitions may have a serialization order, for example, as specified by a "serialization order" tag associated with the node and/or link. At step 512, the graph serialization 418 may be created from the working graph 416 by serializing the graph elements of the working graph 416 in the determined graph serialization order. In an embodiment of the invention, determining the graph serialization order is integral to creating the graph serialization 418. Example steps for creating the graph serialization 418 in accordance with an embodiment of the invention are described below in more detail with reference to FIG. 12.

At step 514, the graph serialization 418 (FIG. 4) may be uploaded (i.e., communicated) to the verified graph management system 304 (FIG. 3). The verified graph management system 304 may process the uploaded graph serialization conventionally to update the base graph 306 with target graph 310 nodes and links. In an embodiment of the invention, the base graph 306 becomes synchronized with the target graph 310 as a result of the conventional processing of the uploaded graph serialization by the verified graph management system 304.

Figure 6:
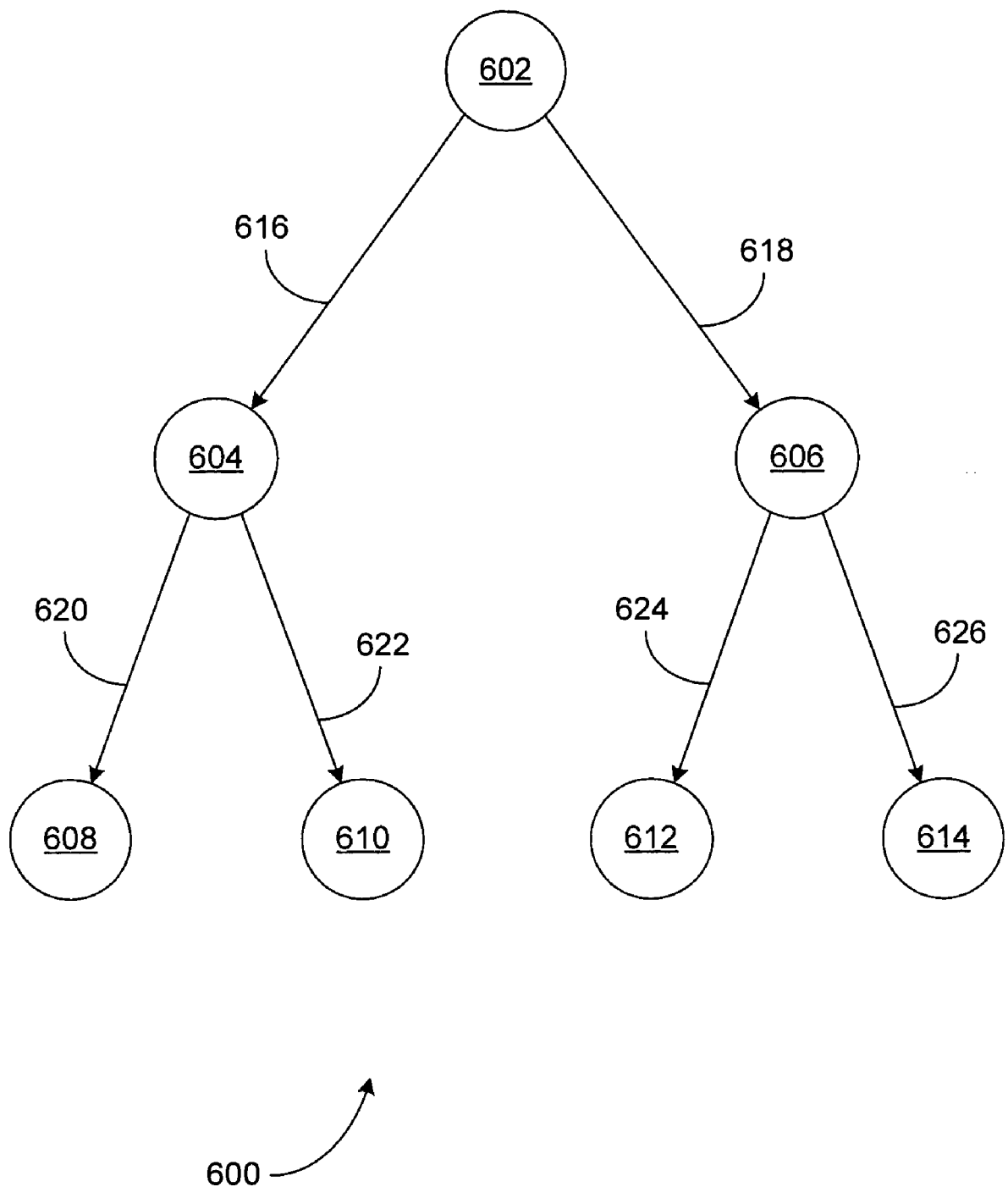
FIG. 6 is a schematic diagram of an example acyclic graph.

Before describing working graph 416 (FIG. 4) partitioning and serialization in more detail, it will be helpful to describe an example partitioning and serialization strategy in accordance with an embodiment of the invention. FIG. 6 depicts an example directed acyclic graph 600 having seven nodes 602, 604, 606, 608, 610, 612 and 614, and six links 616, 618, 620, 622, 624 and 626. Nodes 604 and 606 link from node 602 with links 616 and 618 respectively. Nodes 608 and 610 link from node 604 with links 620 and 622 respectively. Nodes 612 and 614 link from node 606 with links 624 and 626 respectively. The acyclic graph 600 is a tree type graph but the tree graph type isn't a necessary constraint, for example, if node 612 also linked directly from node 602 then the graph 600 would still be acyclic. In addition, while each of the example graphs described in the present application include directed links (i.e., links that "link to" or "link from" a node rather than simply link two nodes), embodiments of the invention are not so limited as will be apparent to one of skill in the art.

If each of the links 616, 618, 620, 622, 624 and 626 is an infrastructure link (i.e., link 616 is created as part of the creation of node 604, link 618 is created as part of the creation of node 606, link 620 is created as part of the creation of node 608, and so on) and a constraint is that links may not be created to nonexistent nodes then, of the possible node and link creation orders for the graph 600, only some are valid. For example, node 604 and link 616 may not be created before node 602. Similarly, node 608 and link 620 may not be created before node 604. However, once, for example, node 602 has been created then several subsequent valid node creation orders are possible including node 604 then node 606 then node 608, or node 604 then node 608 then node 606, or node 606 then node 604 then node 608, and more.

A valid node creation order for the graph 600 (and any suitable acyclic graph) may be determined by categorizing the nodes according to their breadth-first level in a conventional breadth-first walk of the graph 600 from a suitable root node. For example, a suitable root node of graph 600 may be determined by descending the graph 600 to node 602 from an arbitrary node. If node 602 of graph 600 is at a first level of the breadth-first walk then nodes 604 and 606 are at a second level and nodes 608, 610, 612 and 614 are at a third level. Given this categorization, a valid node creation order may be constructed by scheduling the creation of nodes in earlier breadth-first levels before nodes in later breadth-first levels. In the case of graph 600, for example, a valid node creation order may be determined by scheduling the creation of node 602 first and then nodes 604 and 606 (in either order) and then nodes 608, 610, 612 and 614 (in any suitable order).

Figure 7:
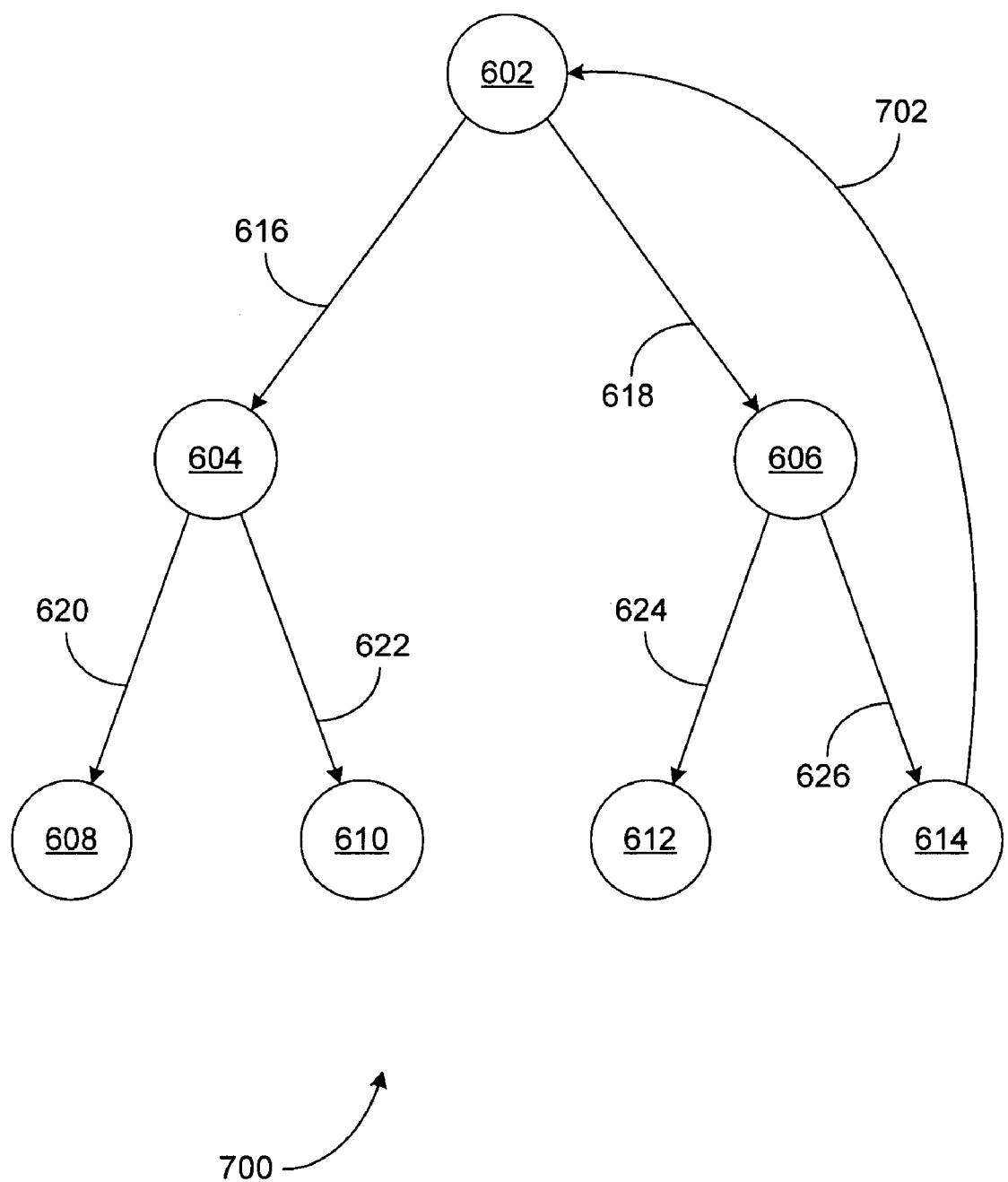
FIG. 7 is a schematic diagram of an example cyclic graph.

However, not every graph is acyclic. FIG. 7 depicts an example directed cyclic graph 700 having the nodes 602, 604, 606, 608, 610, 612 and 614 and links 616, 618, 620, 622, 624 and 626 of the acyclic graph 600 (FIG. 6) as well as an additional link 702 to node 602 from node 614 that creates a cycle or loop in the graph 700 (i.e., from node 602 to node 606 then to node 614 and back to node 602). If the link 702 is partitionable (e.g., is a non-infrastructure link or else is capable of becoming a non-infrastructure link) then partitioning the link 702 from the graph 700 reduces the cyclic graph 700 to the acyclic graph 600. A valid node and link creation order for the cyclic graph 700 (and for any suitable cyclic graph) may then be determined by partitioning links to reduce the cyclic graph to an acyclic component (e.g., acyclic graph 600 for cyclic graph 700), determining a valid node and link creation order for the acyclic component as described above with reference to FIG. 6 and then appending the partitioned links to the node and link creation order (the partitioned links may be appended in any suitable order).

The graph 700 may be reduced to an acyclic graph by partitioning one or more of a number of links including link 618, link 626 and link 702. Which link or links are partitioned from a particular cyclic graph may be dependent on a variety of factors such as whether the link is partitionable, how the link is otherwise categorized, and a number of graph cycles that are broken by partitioning the link. For example, if link 618 and link 702 are infrastructure links but link 626 is not then link 626 may be selected for partitioning rather than link 618 or link 702. If partitioning a particular link breaks more graph cycles (i.e., the link participates in more graph cycles) than another link then the link that breaks more graph cycles may be selected for partitioning over the other links. For example, as shown, each of links 618, 626 and 702 of graph 700 participate in a single cycle. However, if there were an additional link to node 614 from node 610 then link 702 would participate in two graph cycles and link 702 may be selected for partitioning over other links of graph 700.

Figure 8:
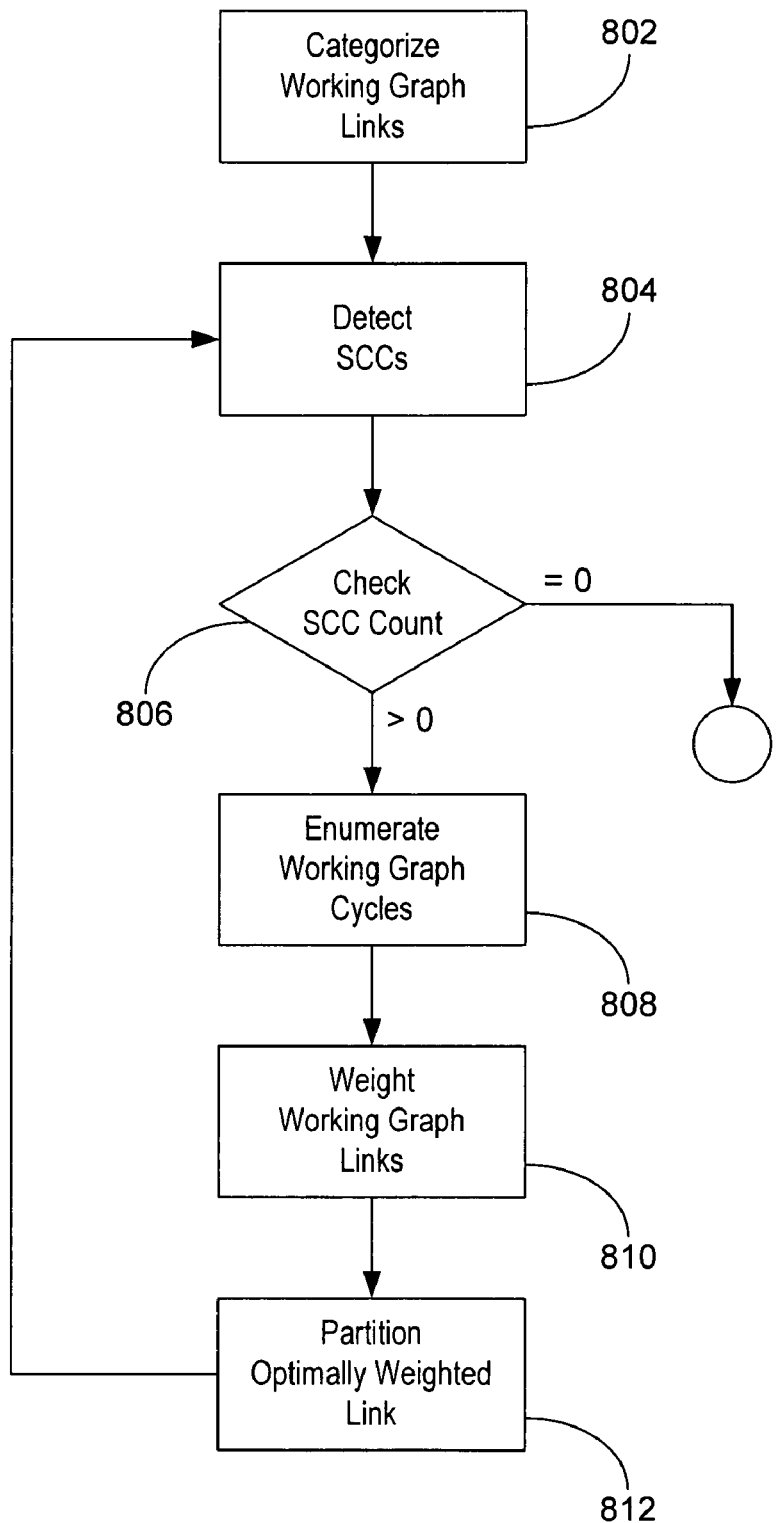
FIG. 8 is a flowchart depicting example steps for partitioning a graph in accordance with an embodiment of the invention.

Having described an example partitioning and serialization strategy, example steps for partitioning the working graph 416 (FIG. 4) are now described in more detail. FIG. 8 depicts example steps for partitioning the working graph 416 in accordance with an embodiment of the invention. At step 802, one or more of the links of the working graph 416 may be assigned to one or more graph synchronization categories, for example, by associating the links with one or more graph synchronization tags. Graph synchronization categories may be applicable to any suitable type of graph, for example, "partitionable link," and "infrastructure link." Graph synchronization categories may also be particular to a particular type of graph. For example, if the working graph 416 represents a lightweight directory access protocol (LDAP) schema then suitable graph synchronization categories include "possible superior link" and "system possible superior link."

At step 804, strongly connected components (SCCs) of the working graph 416 of FIG. 4 (excluding each partitioned link) may be detected. As will be apparent to one of skill in the art, a strongly connected component of a graph is a maximal subgraph in which each node is reachable from each other subgraph node. Any suitable strongly connected component (SCC) detection algorithm may be incorporated in an embodiment of the invention. An example of a suitable conventional strongly connected component detection algorithm is included in Appendix A of the present application.

In an embodiment of the invention, a graph has at least one cycle for each strongly connected component of the graph. At step 806, a count of strongly connected components in the working graph 416 (FIG. 4) may be checked. If the count of strongly connected components is zero then, in an embodiment of the invention, the working graph 416 excluding each partitioned link is acyclic and the synchronization procedure may progress, for example, to a graph serialization step such as step 510 of FIG. 5. If the count of strongly connected components is greater than zero then further link partitioning may be required and the procedure may progress to step 808.

At step 808, the cycles of the working graph 416 of FIG. 4 (excluding each partitioned link) may be enumerated. For each link of the working graph 416, a count may be kept for the number of graph cycles in which the link participates. For example, the count may be stored as an attribute of a graph synchronization tag associated with the link. The counts may be incremented during the cycle enumeration or calculated after the cycle enumeration from cycle enumeration data.

In an embodiment of the invention, the cycles of a graph having one or more strongly connected components may be enumerated with a modified depth-first walk from a suitable root node. For example, any node of the one or more strongly connected components may be a suitable root node. Modifications over a conventional depth-first walk include that an object of the walk is to visit links rather than nodes, and that visited cycles are recorded to help avoid double counting of cycles. Example graphs will aid the description of details of cycle enumeration.

Figure 9:
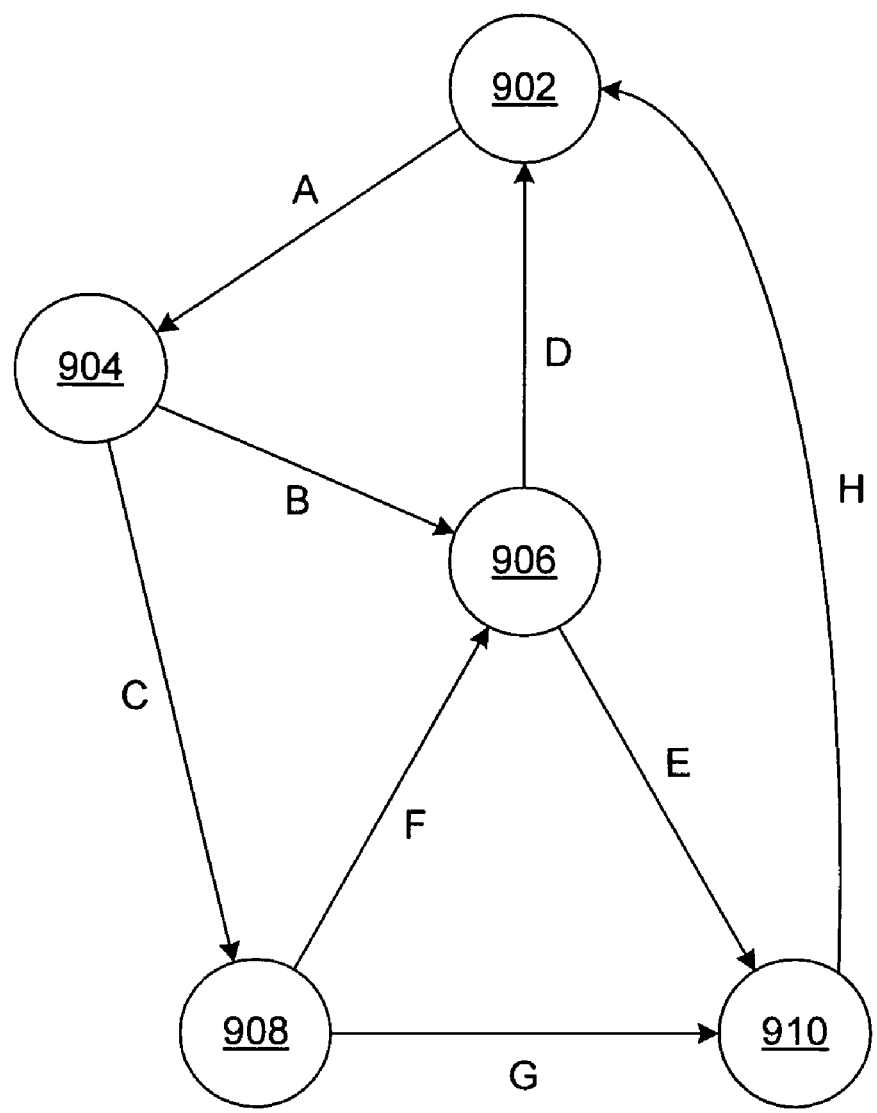
FIG. 9 is a schematic diagram of another example cyclic graph.

FIG. 9 depicts an example directed cyclic graph 900 having five nodes 902, 904, 906, 908 and 910, and eight links labeled A, B, C, D, E, F, G and H. Node 902 links to node 904 with link A. Node 904 links to nodes 906 and 908 with links B and C respectively. Node 906 links to nodes 902 and 910 with links D and E respectively. Node 908 links to nodes 906 and 910 with links F and G respectively. Node 910 links to node 902 with link H. Graph 900 initially detects as a single strongly connected component.

Starting with node 902, the depth-first walk may progress to node 904 over link A, then to node 906 over link B and then back to node 902 over link D thus identifying a first cycle ABD. A next choice from node 906 may be link E leading to node 910, and then back to node 902 over link H thus identifying a second cycle ABEH. A next choice from node 904 may be link C leading to node 908, then link F leading to node 906 and then back to node 902 over link D thus identifying a third cycle ACFD. The remaining cycles ACFEH and ACGH may be similarly enumerated resulting in total cycle counts of 5, 2, 3, 2, 2, 2, 1 and 3 for links A, B, C, D, E, F, G and H respectively (i.e., link A participates in 5 graph cycles, link B participates in 2 graph cycles, link C participates in 3 graph cycles, and so on).

Figure 10:
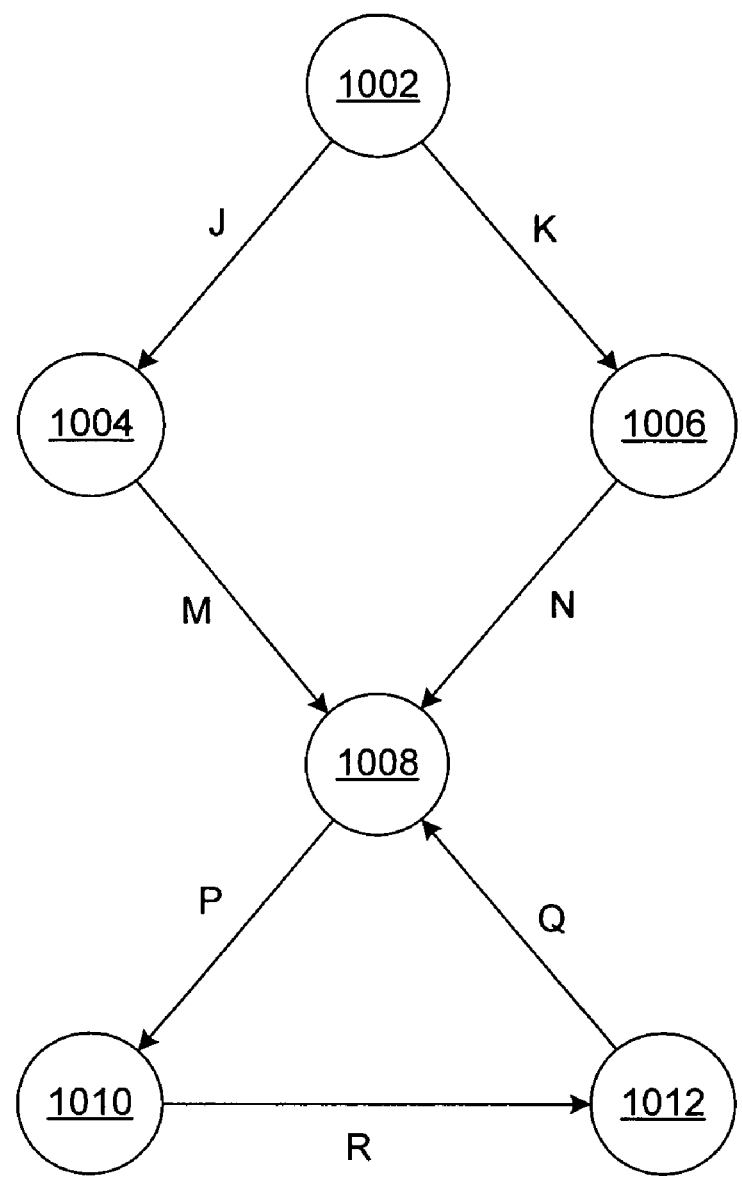
FIG. 10 is a schematic diagram of yet another example cyclic graph.

FIG. 10 depicts an example directed cyclic graph 1000 having six nodes 1002, 1004, 1006, 1008, 1010 and 1012, and seven links labeled J, K, M, N, P, Q and R. In graph 1000, node 1002 links to nodes 1004 and 1006 with links J and K respectively. Node 1004 links to node 1008 with link M and node 1006 links to node 1008 with link N. Node 1008 links to node 1010 with link P, node 1010 links to node 1012 with link R and node 1012 links back to node 1008 with link Q. Nodes 1008, 1010 and 1012 of graph 1000 and their associated links detect as a strongly connected component.

In performing a depth-first walk of graph 1000 from node 1002 in a similar manner as described above for graph 900 (FIG. 9), it is possible to enumerate two paths with cycles, i.e., JMPRQ and KNPRQ, each containing the cycle PRQ. However, in an embodiment of the invention, the cycle count for each of the links P, Q and R of graph 1000 is 1. For example, a double count for links P, R and Q may be avoided by recognizing sequence PRQ in subsequently enumerated cycles and preventing an increment of the associated cycle count for repetitions of the sequence.

Returning to FIG. 8, having enumerated the cycles of the working graph 416 (FIG. 4) at step 808, the procedure may progress to step 810. At step 810, a graph synchronization weight may be determined for each of the links of the working graph 416 (excluding each partitioned link). For example, the graph synchronization weight for a particular link may be equal to the cycle count determined for the link in step 808, or to a linear transformation of the cycle count for the link such as a multiplier and/or a positive or negative offset, or to a nonlinear transformation of the cycle count for the link such as an exponential function of the cycle count. The determined graph synchronization weight for each link may be stored in a graph synchronization tag associated with the link.

Each graph synchronization category may have an associated cycle count transformation to be utilized for determining graph synchronization weight for links in the graph synchronization category. For example, a first graph synchronization category may be associated with a first linear cycle count transformation, a second graph synchronization category may be associated with a second linear cycle count transformation and a third graph synchronization category may be associated with a nonlinear cycle count transformation. Graph synchronization weights may be comparable across graph synchronization categories or comparable only within associated graph synchronization categories, for example, comparable for purposes of determining an optimal graph synchronization weight.

At step 812, an optimally weighted link may be partitioned from the working graph 416 (FIG. 4). The optimally weighted link of the working graph 416 may be the link with the highest determined graph synchronization weight, or with the lowest weight, or with the determined weight closest to a target graph synchronization weight such as zero. In addition, to be considered optimally weighted, the determined graph synchronization weight may be required to be above a minimum threshold, or below a maximum threshold, or within a specified range of graph synchronization weights.

As well as considering each link of the working graph 416 (FIG. 4) as a candidate for the optimally weighted link and thus for partitioning, candidates for the optimally weighted link may be restricted to one or more particular link categories, for example, candidates may be restricted to non-infrastructure links. In addition, the link graph synchronization categories may have an order, for example, a sequential order, and each link graph synchronization category may be considered in order for candidate links. The link graph synchronization categories may be partially ordered. Each of the link graph synchronization categories in an order need not be considered if, for example, a suitable optimally weighted link is found before each of the link graph synchronization categories is considered. A plurality of link graph synchronization categories may be considered simultaneously if graph synchronization weights associated with links within the categories are comparable across the categories. The graph synchronization category of a link may be changed (i.e., re-categorized), for example, if no suitable optimally weighted link is found after considering each link graph synchronization category for candidate links and the graph synchronization component 402 is configured to permit link graph synchronization category changes.

The optimally weighted link may be partitioned from the working graph 416 (FIG. 4) by associating a "partitioned link" graph synchronization tag with the link or adding or updating some other suitable graph synchronization tag or other suitable partitioning indicator. After partitioning the optimally weighted link from the working graph 416, the procedure may return to step 804 to detect any remaining strongly connected components of the working graph 416 and partition further links if necessary. The set of links partitioned from the working graph 416 may be a minimal set of partitioned links required to reduce the working graph 416 to its acyclic component.

Figure 11:
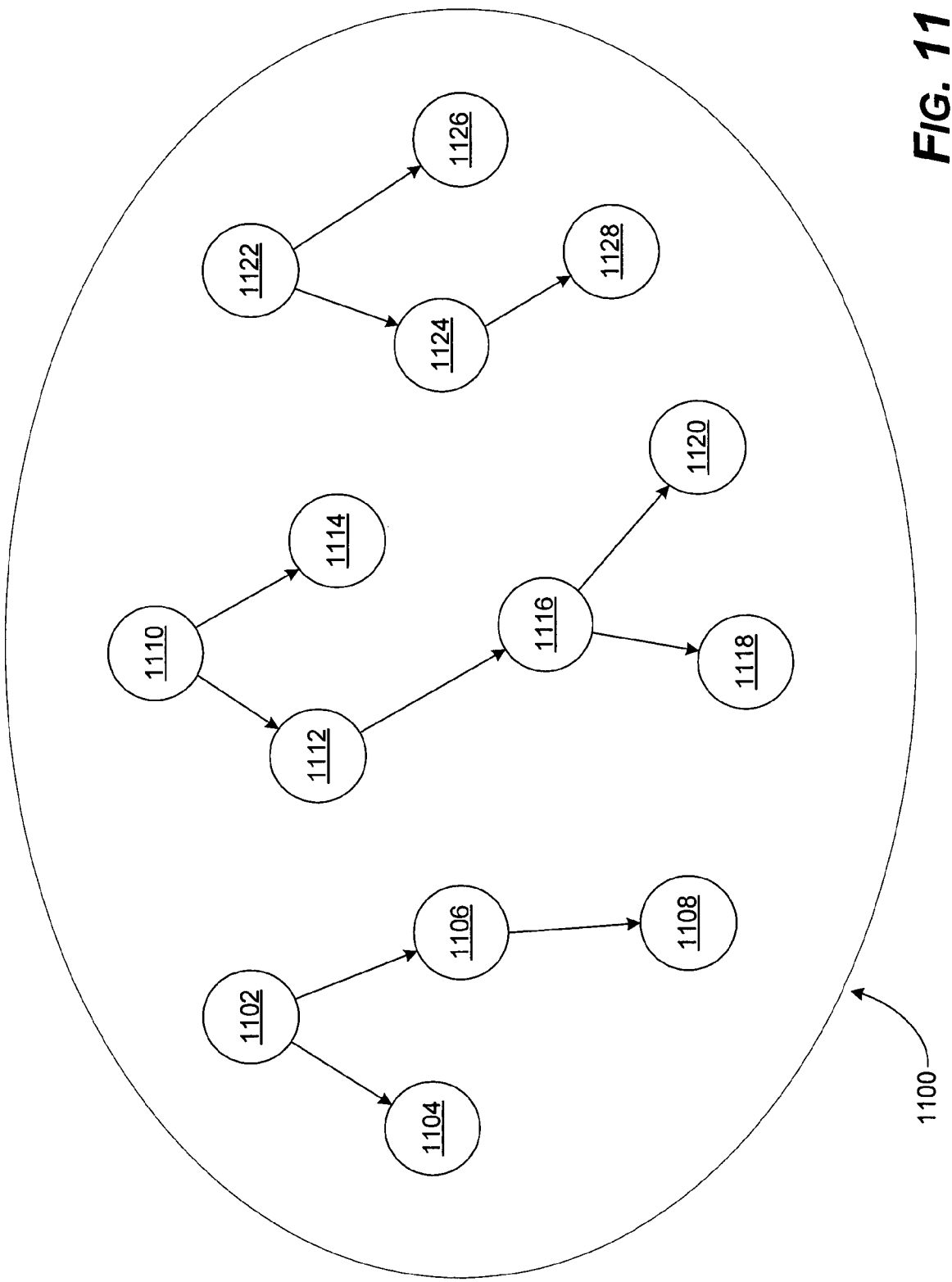
FIG. 11 is a schematic diagram of an example graph partitioned in accordance with an embodiment of the invention.

Example steps for serializing the partitioned working graph 416 (FIG. 4) are now described in more detail. An example graph will aid the description of serialization details. FIG. 11 depicts an example working graph 1100 partitioned in accordance with an embodiment of the invention (partitioned links not shown). The graph 1100 includes three disjoint acyclic components. A first acyclic component includes four nodes 1102, 1104, 1106 and 1108. A second acyclic component includes six nodes 1110, 1112, 1114, 1116, 1118 and 1120. A third acyclic component includes four nodes 1122, 1124, 1126 and 1128.

Figure 12:
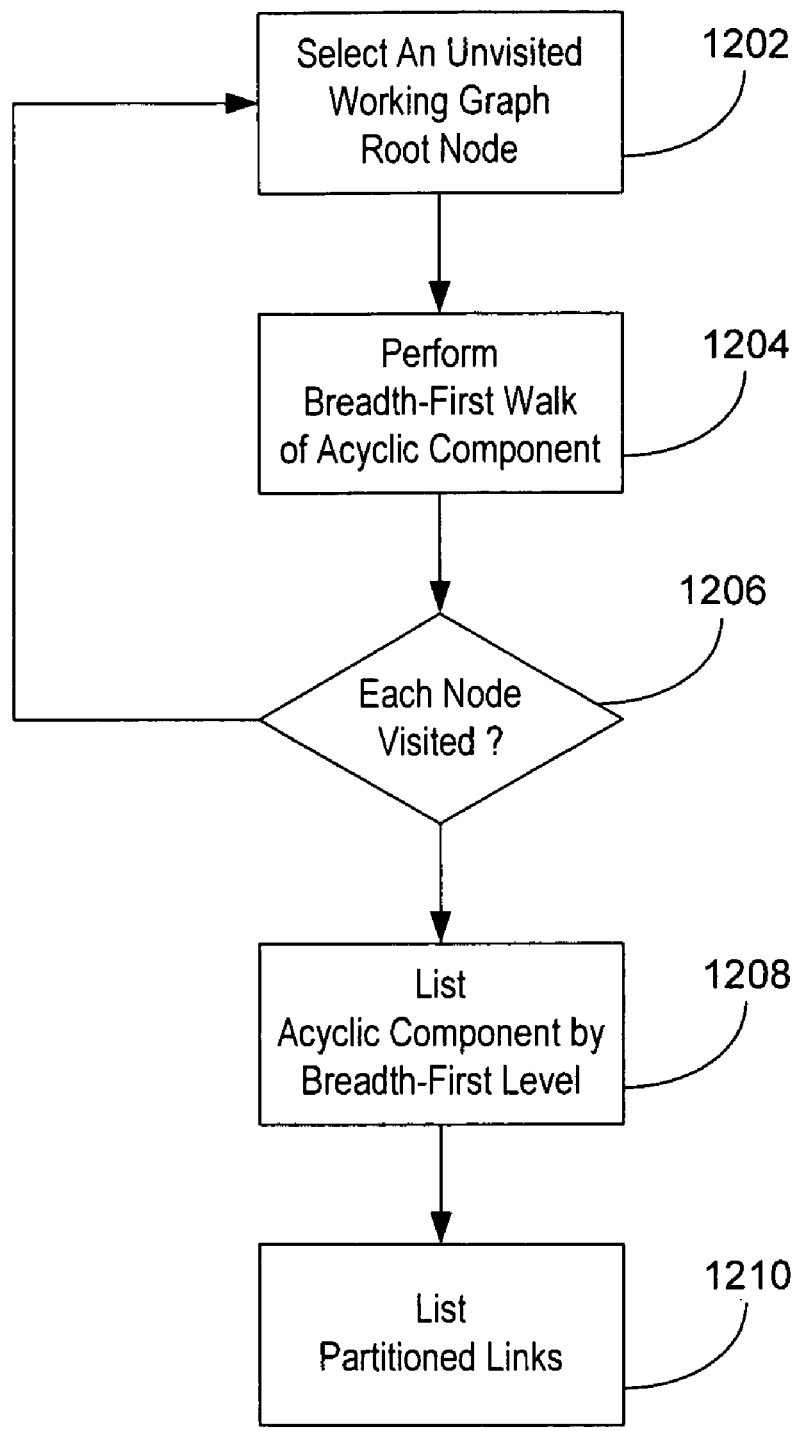
FIG. 12 is a flowchart depicting example steps for serializing a graph in accordance with an embodiment of the invention.

FIG. 12 depicts example steps for serializing the graph 1100 (FIG. 11) in accordance with an embodiment of the invention. At step 1202, a suitable previously unvisited root node of the graph 1100 may be selected. For example, a suitable root node of the graph 1100 may be determined by descending the graph 1100 to one of nodes 1102, 1110 or 1122 from an arbitrary (previously unvisited) node of the graph 1100. At step 1204, as further described above with reference to FIG. 6, the breadth-first level of each node in the acyclic component associated with the selected root node may be determined with a breadth-first walk of the acyclic component from the selected root node. For example, the breadth-first level may be stored in an attribute of a "serialization order" tag associated with the node during the breadth-first walk.

In some graphs (e.g., the graph 1100 of FIG. 11), it may not be possible to traverse the graph (i.e., visit each node of the graph) from a single root node. At step 1206, it may be determined if each of the nodes of graph 1100 has been visited during the walk of step 1204. If each of the nodes of the graph 1100 have been visited then the breadth-first level of each node in the graph 1100 has been determined and the serialization procedure may progress to step 1208. If one or more of the nodes of the graph 1100 have not yet been visited then, in an embodiment of the invention, the procedure returns to step 1202 to select another suitable root node for another breadth-first walk. In an embodiment of the invention, candidates for suitable root nodes are restricted to nodes that are free of inbound links from other nodes, as may be determined utilizing conventional graph operations. The walks may continue until each node of the graph 1100 has been visited.

At step 1208, creation of the graph serialization 418 (FIG. 4) from the partitioned working graph 1100 (FIG. 11) may begin by listing the nodes and links of the graph 1100 in accordance with their breadth-first level as determined in step 1204. Listing the nodes and links of the graph 1100 to the graph serialization 418 may include listing create, read, update and/or delete commands understood by the verified graph management system 304 (FIG. 3) for the nodes and links of the graph 1100. For example, the nodes and associated links of graph 1100 may be listed to the graph serialization 418 as follows: nodes 1102, 1110 and 1122 (in any suitable order), then nodes 1104, 1106, 1112, 1114, 1124 and 1126 (in any suitable order) and their associated links, then nodes 1108, 1116 and 1128 (in any suitable order) and their associated links, and then nodes 1118 and 1120 (in either order) as well as their associated links.

At step 1210, the partitioned links of the graph 1100 (FIG. 11) may be listed to the graph serialization 418 (FIG. 4) in any suitable order. Following step 1210, in an embodiment of the invention, the graph serialization 418 does contain a graph serialization suitable for synchronizing the base graph 306 (FIG. 3) with the target graph 310 and the synchronization procedure may progress to a verified graph management system upload step such as step 514 of FIG. 5.

FIG. 13 depicts an example graph synchronization application programming interface 1300 in accordance with an embodiment of the invention. The graph synchronization application programming interface 1300 includes a set partitioning parameters 1302 element, a get partitioning parameters 1304 element, a partition graph 1306 element, a serialize graph 1308 element and a synchronize graphs 1310 element. Each application programming interface element 1302, 1304, 1306, 1308 and 1310 may include one or more interface specifications that specify the manner in which computer system components may configure, control and/or interact with the graph synchronization component 402 (FIG. 4). As will be apparent to one of skill in the art, the interface specifications may include function call specifications, program object specifications, message specifications such as request/response message pairs, and/or any other suitable programming interface specification.

The set partitioning parameters 1302 application programming interface element may enable computer system components to set one or more partitioning parameters utilized by the graph synchronization component 402 (FIG. 4) when partitioning the working graph 416. Interface specification parameters may include link graph synchronization categories (ordered and unordered), cycle count transformations associated with each link graph synchronization category, indicators as to whether graph synchronization weights are comparable within or across link graph synchronization categories, criteria for determining optimal graph synchronization weights such as target weights, and maximum and minimum weight thresholds, and indicators as to whether links in specified categories may be re-categorized to specified other categories. For example, the cycle count transformations associated with each link graph synchronization category may be specified as simple multipliers and offsets (for linear transformations), with expression defining strings such as those utilized by conventional spreadsheet applications or conventional programming languages, or with any suitable transformation specification.

The get partitioning parameters 1304 application programming interface element may enable computer system components to retrieve one or more of the partitioning parameters utilized by the graph synchronization component 402. Interface specification parameters for the get partitioning parameters 1304 element may include indicators as to which partitioning parameters to retrieve as well as parallel programming (multithreaded) behavior specifiers such as wait and timeout flags.

The partition graph 1306 application programming interface element may enable computer system components to have a graph partitioned by the graph synchronization component 402 in accordance with an embodiment of the invention. Interface specification parameters may include the graph to be partitioned. For example, partitioned links of the graph may have a "partitioned link" graph synchronization tag associated with them.

The serialize graph 1308 application programming interface element may enable computer system components to have a graph serialized by the graph synchronization component 402 in accordance with an embodiment of the invention. Interface specification parameters may include the graph to be serialized, and the type of serialization desired. For example, the serialized graph may be provided as an ordered list of nodes and links, or as a reference to an LDAP data interchange format (LDIF) file including suitable LDIF elements such as node and link creation commands.

The synchronize graphs 1310 application programming interface element may enable computer system components to synchronize graphs in accordance with an embodiment of the invention. Interface specification parameters may include references to base and target graphs. For example, a graph reference may include a reference to a graph management system such as a network host name or a uniform resource locator (URL), and a graph name such as an alphanumeric character string or a universal unique identifier (UUID).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

APPENDIX A

Finding Strong Components in a Digraph

A strong component S of a digraph G is a strongly connected subgraph of G that is as large as possible. That is, if any further nodes or edges from G are added to S then it will no longer be strongly connected. A digraph is strongly connected if for any two vertices u and v there is a directed path from vertex u to vertex v (and so also a directed path from vertex v to vertex u). This algorithm finds all directed components of a graph.

This algorithm can be used with the traffic engineer's model of a road system that has one way streets represented by a directed edge and two way streets between junctions corresponding to vertices u and v represented by two directed edges (u, v) and (v, u). The problem of deciding whether or not the whole road system is accessible when one street is taken out for repairs is equivalent to deciding whether or not the graph, with the appropriate edge deleted, is strongly connected. See the note at the end for a simpler algorithm for doing this.

The algorithm is based on finding directed cycles (directed closed path where the first vertex equals the last vertex, but with no other repeat vertices). A directed cycle is strongly connected because from any node the cycle can be followed to reach any other node. All of the component can be found this way, because any two vertices u and v in a strong component are on a directed cycle formed from the directed path from u and v then the directed path from vertex v back to vertex u.

1. Initial Set Up:
   a. A graph/digraph with some or all of its edges directed. Replace any undirected edges (u, v) by two directed edges (u, v) and (v, u). Start the search at any vertex s.
   b. The components will be stored in the sets $S_1$, $S_2$, $S_3$, . . . .
2. Iteration:
   a. Do a modified depth first search (including backtracking) from s creating a search path following the edge directions. Each time a vertex v is added to the search path then check to see if there is an edge directed from v to a vertex w already on the search path (thus detecting a directed cycle).
   b. If a directed cycle C is detected then add the nodes and edges of C to one of the component sets $S_i$ as follows (leaving the DFS search path unchanged):
      If C has no nodes in common with any nodes of any previously defined sets $S_i$ then put the nodes and edges of C in a new set $S_i$, or,
      If C has nodes in common with just one previously defined $S_i$ then add the nodes and edges of C to this set $S_i$, or,
      If C has nodes in common two or more previously defined $S_i$ then amalgamate all of these into one of them and add the nodes and edges of C to this set.
      Go back to part (a) and continue the depth first search.
   c. When the depth first search terminates (because it has backtracked to the start node s and no more searching is possible), then
      If all nodes have been visited (are in one of the $S_i$) then go to the conclusion, or,
      Choose an unvisited node, call it s, a new start node for the DFS, and go to part 2(a) above.

2. CONCLUSION

Each of the separate sets found is a strong component (see also the note at the end).

Notes:
(a) This algorithm will identify a single node as a strong component when that node is not contained in any directed cycle.
(b) Those edges that join nodes of two different strong components $S_i$ will not be included in any of the $S_i$ (so in such a case, amalgamating all of the strong components will not create the original digraph).
(c) To solve the road engineer's problem a simpler algorithm can be used. The problem is to check whether or not a strongly connected digraph (representing a road system) is still strongly connected when one directed edge (u, v) (representing a one-way street) is removed. To do this, start from u and do a modified depth-first search that does not use the edge (u, v). If the vertex v is found in this search then it is still strongly connected.

What is claimed is:

1. A computer storage medium storing thereon computer-executable instructions, which are executed by a computing system having a graph synchronization component that includes a graph synchronization engine, for performing a method for facilitating synchronization of a cyclic base graph managed by a verified graph management system, the method comprising:
   the graph synchronization component requesting and receiving a base graph, which is managed by a verified graph management system and which is to be synchronized with a target graph;
   the graph synchronization component requesting and receiving the target graph, which is managed by a graph management system;
   the graph synchronization engine creating a cyclic working graph from the target graph, and which includes graph elements comprising nodes and links, the cyclic working graph including at least every node and every link of the target graph, wherein at least one node or link of the target graph is absent from the base graph;
   the graph synchronization engine associating one or more tags with corresponding graph elements, wherein the one or more tags include a first tag specifying whether a corresponding graph element is present in the base graph, a second tag specifying a weight associated with the corresponding graph element, and a synchronization tag corresponding to an order for synchronizing corresponding graph elements;
   the graph synchronization engine partitioning the cyclic working graph based at least in part on one or more graph synchronization tags associated with one or more of the graph elements, wherein partitioning of the cyclic working graph includes partitioning and thereby separating one or more links of the cyclic working graph from an acyclic component of the cyclic working graph and such that the partitioning creates a plurality of partition components, including an acyclic component of the cyclic working graph and a set of partitioned links of the cyclic working graph; and
   determining a serialization order for the plurality of graph elements of the cyclic working graph based at least in part on the partitioning; and
   creating a serialization of the cyclic working graph having the determined serialization order.

2. The computer storage medium of claim 1, wherein:
   the cyclic graph comprises each graph element identified within the target graph.

3. The computer storage medium of claim 2, wherein the verified graph management system managing the base graph is separate and distinguished from the graph management system managing the target graph.

4. The computer storage medium of claim 3, wherein the verified graph management system comprises a lightweight directory access protocol (LDAP) server.

5. The computer storage medium of claim 1, wherein the method further comprises:
   communicating the serialization of the cyclic working graph to the verified graph management system, which is used by the verified graph management system to synchronize the base graph.

6. The computer storage medium of claim 5, wherein the serialization of the cyclic working graph comprises LDAP data interchange format (LDIF) entries.

7. The computer storage medium of claim 1, wherein the serialization order corresponds to a graph element creation order.

8. The computer storage medium of claim 1, wherein graph elements of the first partition are before graph elements of the second partition in the serialization order.

9. The computer storage medium of claim 1, wherein the serialization order further corresponds to an order of the graph elements of the acyclic component of the cyclic working graph.

10. The computer storage medium of claim 9, wherein the order of the graph elements of the acyclic component of the cyclic working graph corresponds to a breadth-first walk of the acyclic component of the cyclic working graph.

11. The computer storage medium of claim 1, wherein:
determining the serialization order for the plurality of graph elements of the cyclic working graph comprises determining a serialization order for the plurality of graph elements of the acyclic component of the cyclic working graph; and
the serialization order for each of the plurality of graph elements of the acyclic component of the cyclic working graph corresponds to a level of the graph element in a breadth-first walk of the acyclic component of the cyclic working graph.

12. The computer storage medium of claim 11, wherein:
the acyclic component of the cyclic working graph comprises a plurality of disjoint acyclic graphs; and
the breadth-first walk of the acyclic component of the cyclic working graph traverses each of the plurality of disjoint acyclic graphs.

13. The computer storage medium of claim 1, wherein the set of partitioned links of the cyclic working graph are partitioned from the plurality of links of the cyclic working graph in order to determine the acyclic component of the cyclic working graph.

14. The computer storage medium of claim 1, wherein each link of the set of partitioned links of the cyclic graph is selected from the plurality of links of the cyclic working graph as a function of a weight determined for the link.

15. The computer storage medium of claim 1, wherein the method further comprises:
enumerating at least one cycle of the cyclic working graph; and
determining a weight for each of at least one link of the cyclic working graph, the weight determined for the link being a function of a number of graph cycles in which the link participates.

16. The computer storage medium of claim 15, wherein the function of the number of graph cycles in which the link participates comprises a linear function of the number of graph cycles in which the link participates.

17. The computer storage medium of claim 1, wherein the method further comprises:
determining a weight for each of the plurality of links of the cyclic working graph; and
partitioning an optimally weighted link of the cyclic working graph.

18. The computer storage medium of claim 17, wherein the optimally weighted link is a highest weighted link.

19. The computer storage medium of claim 1, wherein:
each link of the cyclic working graph is associated with at least one of a plurality of link categories;
the plurality of link categories comprises a plurality of ordered link categories; and
partitioning the cyclic working graph comprises considering each of the plurality of ordered link categories in order.

20. The computer storage medium of claim 1, wherein the method further comprises:
detecting zero or more strongly connected components (SCC) of the cyclic working graph, each strongly connected component comprising a maximal subpath of the cyclic working graph that consists of a plurality of subgraph nodes and wherein all subgraph nodes are reachable from other subgraph nodes; and
progressing from the partitioning step if zero strongly connected components are detected.

21. The computer storage medium of claim 1, wherein:
the cyclic working graph corresponds to a lightweight directory access protocol (LDAP) schema; and
the serialization order corresponds to an order of entries in a LDAP data interchange format (LDIF) file.

22. The computer storage medium of claim 1, wherein:
the set of partitioned links of the cyclic graph comprises at least one optimally weighted link of the cyclic graph; and
weight for a link of the cyclic graph is determined as a function of a number of graph cycles in which the link participates.

23. The computer storage medium of claim 1, wherein:
the cyclic graph corresponds to a lightweight directory access protocol (LDAP) schema; and
the serialization of the cyclic graph comprises LDAP data interchange format (LDIF) entries.

24. A computer-implemented method, which is implemented by a computing system having a graph synchronization component that includes a graph synchronization engine, for facilitating synchronization of a cyclic base graph managed by a verified graph management system, the method comprising:
the graph synchronization component requesting and receiving a base graph, which is managed by a verified graph management system and which is to be synchronized with a target graph;
the graph synchronization component requesting and receiving the target graph, which is managed by a graph management system;
the graph synchronization engine creating a cyclic working graph from the target graph, and which includes graph elements comprising nodes and links, the cyclic working graph including at least every node and every link of the target graph, wherein at least one node or link of the target graph is absent from the base graph;
the graph synchronization engine associating one or more tags with corresponding graph elements, wherein the one or more tags include a first tag specifying whether a corresponding graph element is present in the base graph, a second tag specifying a weight associated with the corresponding graph element, and a synchronization tag corresponding to an order for synchronizing corresponding graph elements;
the graph synchronization engine partitioning the cyclic working graph based at least in part on one or more graph synchronization tags associated with one or more of the graph elements, wherein partitioning of the cyclic working graph includes partitioning and thereby separating one or more links of the cyclic working graph from an acyclic component of the cyclic working graph and such that the partitioning creates a plurality of partition components, including an acyclic component of the cyclic working graph and a set of partitioned links of the cyclic working graph; and
determining a serialization order for the plurality of graph elements of the cyclic working graph based at least in part on the partitioning; and
creating a serialization of the cyclic working graph having the determined serialization order.

25. A computerized system comprising a processor and a graph synchronization component, the graph synchronization component being configured to, at least:
partition a cyclic graph having a plurality of graph elements into a plurality of partitions, the plurality of partitions comprising:
an acyclic component of the cyclic graph; and
a set of partitioned links; and
synchronize one or more tags with corresponding graph elements of the plurality of graph elements, wherein the one or more tags include a first tag specifying whether a corresponding graph element is present in the base graph, a second tag specifying a weight associated with the corresponding graph element, and a synchronization tag corresponding to an order for synchronizing corresponding graph elements; and determine a serialization order for the plurality of graph elements of the cyclic graph, the serialization order corresponding to an order of the plurality of partitions;

the computerized system comprising stored computer executable instructions which, when executed, implement the method recited in claim 24.

26. The computerized system of claim 25, wherein:
the computerized system further comprises:
- a first graph management system managing the base graph; and
- a second graph management system managing the target graph;

the graph synchronization component is further configured to, at least:
- retrieve the base graph from the first graph management system; and
- retrieve the target graph from the second graph management system; and the cyclic graph comprises each graph element in the target graph that is not also in the base graph.

27. The computerized system of claim 26, wherein the first graph management system comprises a verified graph management system.

28. The computerized system of claim 27, wherein the verified graph management system comprises a lightweight directory access protocol (LDAP) server.

29. The computerized system of claim 25, wherein the graph synchronization component comprises a graph synchronization graphical user interface (GUI) that enables a user of the computerized system to, at least, adjust graph partitioning parameters.

30. The computerized system of claim 25, wherein the graph synchronization component is capable of being configured for a plurality of modes of operation, the plurality of modes of operation comprising:
- a partially automated mode of operation; and
- a fully automatic mode of operation.

31. The computerized system of claim 25, wherein:
determining the serialization order for the plurality of graph elements of the cyclic graph comprises determining a serialization order for the plurality of graph elements of the acyclic component of the cyclic graph; and the serialization order for each of the plurality of graph elements of the acyclic component of the cyclic graph corresponds to a level of the graph element in a breadth-first walk of the acyclic component of the cyclic graph.

32. The computerized system of claim 25, wherein the graph synchronization component is further configured to, at least:
- enumerate at least one cycle of the cyclic graph; and
- determine a weight for each of at least one link of the cyclic graph, the weight determined for the link being a function of a number of graph cycles in which the link participates.

33. The computerized system of claim 25, wherein:
the cyclic graph corresponds to a lightweight directory access protocol (LDAP) schema; and the serialization order corresponds to an order of entries in a LDAP data interchange format (LDIF) file.

* * * * *